(12) United States Patent
Seroff et al.

(10) Patent No.: US 12,204,300 B2
(45) Date of Patent: Jan. 21, 2025

(54) ENERGY MANAGEMENT FOR NON-CHARGING LOAD AT SITE WITH CHARGING STATION BIDIRECTIONALITY

(71) Applicant: SPEED CHARGE, LLC, Carter Lake, IA (US)

(72) Inventors: Nicholas Seroff, San Jose, CA (US); Tabish Shibly, Oakland, CA (US)

(73) Assignee: SPEED CHARGE, LLC, Carter Lake, IA (US)

( * ) Notice: Subject to any disclaimer, the term of this patent is extended or adjusted under 35 U.S.C. 154(b) by 0 days.

(21) Appl. No.: 18/066,975

(22) Filed: Dec. 15, 2022

(65) Prior Publication Data

US 2024/0201642 A1    Jun. 20, 2024

(51) Int. Cl.
G05B 15/02    (2006.01)

(52) U.S. Cl.
CPC ...... *G05B 15/02* (2013.01); *G05B 2219/2639* (2013.01)

(58) Field of Classification Search
CPC .......... G05B 15/02; G05B 2219/2639
See application file for complete search history.

(56) References Cited

U.S. PATENT DOCUMENTS

| | | | | |
|---|---|---|---|---|
| 6,104,160 A * | 8/2000 | Iwata | ...................... | B60L 53/18 320/108 |
| 8,054,039 B2 | 11/2011 | Bauerle et al. | | |
| 9,511,676 B2 * | 12/2016 | Loftus | ...................... | B60L 53/16 |
| 11,584,250 B1 * | 2/2023 | Palombini | ............... | B60L 53/50 |
| 2008/0067974 A1 * | 3/2008 | Zhang | ..................... | B60L 53/63 903/907 |
| 2010/0017045 A1 * | 1/2010 | Nesler | ................... | B60L 53/665 700/295 |
| 2012/0074901 A1 | 3/2012 | Mohammed et al. | | |

(Continued)

OTHER PUBLICATIONS

Ray, Pravat Kumar, et al. "Modeling and power management of electric vehicle charging system." 2021 International Conference on Smart-Green Technology in Electrical and Information Systems (ICSGTEIS). IEEE, 2021. (Year: 2021).*

(Continued)

*Primary Examiner* — Santosh R Poudel
(74) *Attorney, Agent, or Firm* — MARSHALL, GERSTEIN & BORUN LLP (57) ABSTRACT

In order to provide power for non-charging loads located at charging sites, the systems and methods disclosed herein provide for controlling electric vehicle charging stations to provide alternating current (AC) power to the non-charging loads from power stored in their batteries. One or more charging stations are configured to charge their batteries from an AC power source that also powers a non-charging load at the charging site. Each charging station includes a battery, a bidirectional inverter, and a system controller configured to determine occurrence of a triggering condition associated with availability of the AC power source and to control the bidirectional inverter to convert a direct current (DC) power from the battery into an AC output current to provide to the non-charging load via a local AC circuit at the charging site. The non-charging load may thus be powered without drawing power from the AC power source.

11 Claims, 5 Drawing Sheets

(56) References Cited

U.S. PATENT DOCUMENTS

| | | | |
|---|---|---|---|
| 2013/0113413 A1 | 5/2013 | Harty et al. | |
| 2015/0054466 A1 | 2/2015 | Kinomura et al. | |
| 2015/0155715 A1* | 6/2015 | Kobayashi | B60L 53/64 |
| | | | 307/24 |
| 2015/0288317 A1* | 10/2015 | Huang | H02S 10/40 |
| | | | 307/26 |
| 2016/0006253 A1* | 1/2016 | Saussele | H02J 3/38 |
| | | | 307/24 |
| 2016/0009191 A1 | 1/2016 | Becker et al. | |
| 2016/0152151 A1* | 6/2016 | Yang | B60L 53/22 |
| | | | 320/109 |
| 2017/0174086 A1* | 6/2017 | van de Loo | H02K 7/1815 |
| 2018/0022227 A1* | 1/2018 | Foldesi | H02J 7/0063 |
| | | | 307/10.1 |
| 2019/0389315 A1* | 12/2019 | Zhu | B60L 53/64 |
| 2020/0031238 A1* | 1/2020 | Kydd | H02J 9/062 |
| 2020/0321797 A1 | 10/2020 | Gerrits | |
| 2021/0039516 A1* | 2/2021 | Brombach | H02J 3/144 |
| 2021/0104910 A1* | 4/2021 | Li | H02J 7/0024 |
| 2021/0170897 A1 | 6/2021 | Ellis | |
| 2023/0011299 A1* | 1/2023 | Neligan | B60L 53/20 |
| 2023/0033955 A1* | 2/2023 | Seroff | B60L 53/16 |
| 2023/0042829 A1* | 2/2023 | Cohn | F02D 19/0647 |

OTHER PUBLICATIONS

International Search Report and Written Opinion for Application No. PCT/US2022/038802, dated Jan. 19, 2023.

\* cited by examiner

ENERGY MANAGEMENT FOR NON-CHARGING LOAD AT SITE WITH CHARGING STATION BIDIRECTIONALITY

TECHNICAL FIELD

At least one aspect generally relates to improvements to vehicle charging stations generally and more particularly to improvements in energy management and charge transfer between vehicle charging stations and a non-charging load at a charging site to provide supplemental or backup power to the non-charging load.

BACKGROUND

Many modern devices and systems require electric power to operate, including systems critical for health, safety, and security at commercial and residential sites. While electric utility power grids usually supply such power reliably and at low cost, occasional disruptions are caused by natural disasters, equipment failures, or supply-demand imbalance. To provide continued power for essential systems during such occasions, some sites have on-site generators or battery backup systems. Such backup power systems are expensive, require regular maintenance and testing due to infrequent use, require space and support for heavy generator or battery equipment, may require designated circuits to power just the critical systems at the site, and offer limited power output. For these reasons, such backup power systems are typically only installed at sites where even temporary power interruptions can have significant and irreversible adverse effects, such as medical facilities. Thus, most sites do not have such backup power systems and are not equipped for such backup power systems without changes to their physical layout or to their electric circuits.

Charging stations provide electric power to electric vehicles (EVs), including plug-in hybrid vehicles, that can operate without the use of or with limited use of hydrocarbon-based fuels. Installation of conventional charging stations typically requires improvements to infrastructure, including upgrades to electrical service and construction of suitable housing. The costs, planning, and time required to install these charging systems can be a deterrent to potential commercial or residential operators. To reduce the installation and operating requirements associated with traditional charging stations, some charging stations include batteries to store energy received from a power source (such as an electric utility power grid) over an extended time interval. Such energy-storing charging stations have heretofore been used only to provide charging current to vehicles. With the continued expansion of such charging stations to more charging sites, however, such charging stations will store a considerable amount of electrical energy at many charging sites that do not currently have backup power systems.

SUMMARY

The systems, methods, and computer-readable instructions disclosed herein solve the problems associated with existing backup generator systems through providing charge transfers between electric vehicle chargers and local non-charging loads at a charging site. As described herein, method for providing electric power to a non-charging load at a charging site having at least one vehicle charging system is provided, the method comprising: receiving an input electric power at an input port of the vehicle charging system from an alternating current (AC) power source that further provides AC power to the non-charging load; converting the input electric power into a direct current (DC) energy storage current by a bidirectional inverter of the vehicle charging system; charging a battery of the vehicle charging system with the DC energy storage current; determining occurrence of a triggering condition associated with availability of the AC power source by a system controller of the vehicle charging system based upon power source data regarding the AC power source; and in response to determining occurrence of the triggering condition, controlling the bidirectional inverter of the vehicle charging system to convert a DC current from the battery into an AC output current, such that the AC output current is provided to the non-charging load via a local AC circuit at the charging site to power the non-charging load.

In some embodiments, the AC power source comprises an electric power grid, and the triggering condition comprises a demand level of the electric power grid exceeding a demand level threshold for a time interval. In further embodiments, the triggering condition may comprise the input electric power is no longer being received at the input port, which may be determined by the system controller. In still further embodiments, determining occurrence of the triggering condition may comprise detecting receipt of an electronic message from either a site meter or a centralized management system, the electronic message indicating a demand level for the AC power source exceeds a threshold demand level. In some such embodiments, the centralized management system may monitor the power source data regarding the AC power source, generate an electronic message including the command to provide the AC output current, and send the electronic message to the system controller via a communication network. Monitoring the power source data regarding the AC power source may include obtaining the power source data from a server associated with the electric power grid, determining a demand level associated with the electric power grid based upon the power source data, and generating the electronic message in response to determining the demand level exceeds a demand level threshold for a time interval.

In various embodiments, the input electric current may be receive via the local AC circuit or via a separate input AC circuit. Thus, in some embodiments, the input electric current is received via the local AC circuit, and the AC output current is provided to the local AC current via the input port. In other embodiments, the local AC circuit is separate from the input AC circuit that provides the input electric power. In some such embodiments, the input port comprises a first AC port connected to the input AC circuit, and the local AC circuit is connected to a second AC port of the vehicle charging system.

According to some aspects, a vehicle charging system for providing electric power to a non-charging load at a charging site is provided, comprising: one or more input ports configured to receive input electric power from an AC power source that further provides AC power to the non-charging load; a battery configured to receive and store DC electric power derived from the input electric power; a bidirectional inverter disposed between the one or more input ports and the battery, the bidirectional inverter being configured to convert the input electric power from the one or more input ports into a DC energy storage current to charge the battery and to convert a DC current from the battery into an AC output current to be supplied from the vehicle charging system to a local AC circuit via the one or more input ports; a vehicle coupling configured to receive a charging current from the battery and to provide an electrical interconnect between the vehicle charging system and the vehicle in order to provide the charging current to the vehicle; and a system controller comprising one or more processors configured to: (i) determine occurrence of a triggering condition associated with availability of the AC power source based upon power source data regarding the AC power source; and (ii) in response to determining occurrence of the triggering condition, control the bidirectional inverter of the vehicle charging system to convert the DC current from the battery into the AC output current to provide the AC output current to the non-charging load via the local AC circuit at the charging site to power the non-charging load.

According to another aspect, a site charging system providing electric power to a non-charging load at a charging site is provided, the site charging system comprising: a plurality of vehicle charging systems as described above disposed at the charging site connected via a local AC circuit; and a centralized management system communicatively connected to the plurality of vehicle charging systems via an electronic communication connection, comprising one or more processors configured to: (i) determine occurrence of a triggering condition associated with availability of the AC power source based upon power source data regarding the AC power source and (ii) in response to determining occurrence of the triggering condition, cause the respective system controllers of the plurality of charging systems to control the respective bidirectional inverters of the vehicle charging systems to convert the DC currents from the respective batteries into the AC output current to provide the AC output current to the non-charging load via the local AC circuit at the charging site to power the non-charging load.

Additional or alternative methods, systems, or computer-readable media storing instructions for implementing all or part of the aspects described above may also be provided to provide electric power to a non-charging load at a charging site. Additional or alternative features described herein below may be included in some aspects.

DETAILED DESCRIPTION

The techniques disclosed herein generally relate to solving the problems associated with existing backup generator systems through providing charge transfers between electric vehicle chargers and local non-charging loads at a charging site. In order to provide backup electric power to such non-charging loads, the techniques disclosed herein are directed to providing alternating current (AC) power from batteries of one or more electric vehicle chargers to such non-charging loads via a local AC circuit at the charging site. The electric vehicle chargers thus convert direct current (DC) power from their batteries to an output AC current to supply the local AC circuit, from which the non-charging loads may draw power. Additional or alternative features are described in further detail below.

Several aspects of electric vehicle (EV) or plug-in hybrid vehicle charging systems and related charging site systems will now be presented with reference to various embodiments. Although described herein as relating to EVs, it should be understood that the techniques may be applied equally to plug-in hybrid vehicles or other wholly or partially battery-powered devices that may be charged by a high-voltage or high-power charging station. Charging stations are used for recharging batteries in EVs by supplying AC or DC power to EVs. In turn, the charging stations receive an electric power supply from a utility power grid connection or local power source (e.g., solar, wind, water, or hydrocarbon-powered power generation systems). The charging stations store power in one or more internal or connected batteries in order to smooth power consumption over time. In addition to using such stored power to charge EVs, charging stations may further provide such stored power to other charging stations or non-charging loads disposed at the same charging site, thereby enabling efficient use of the stored power and providing backup power to the charging site when a grid connection is unavailable or unstable.

Figure 1A:
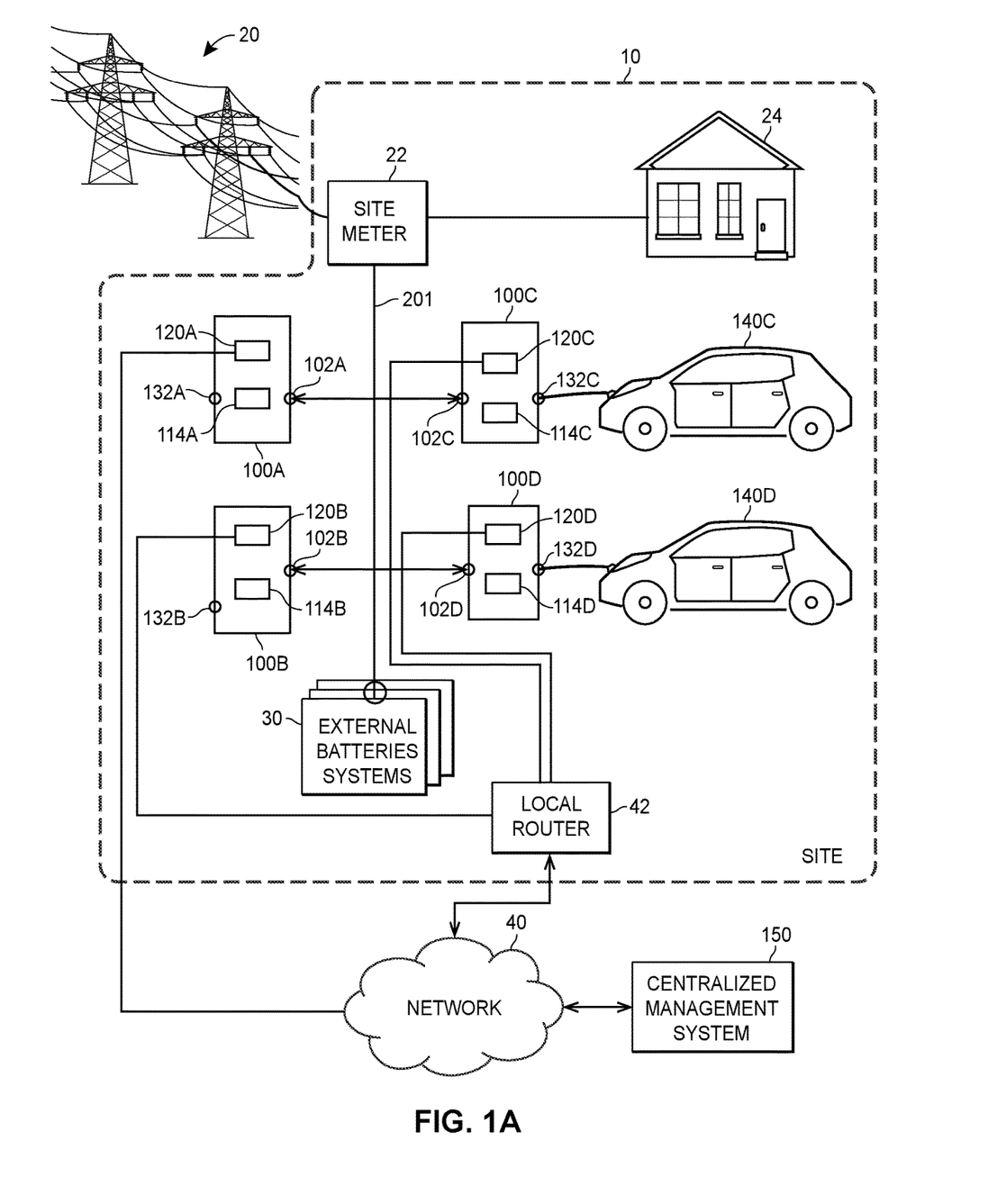
FIGS. 1A-B illustrate block diagrams of examples of a charging site configured for energy management between a non-charging load and multiple vehicle charging systems via a local AC circuit in accordance with certain aspects disclosed herein.
Figure 1B:
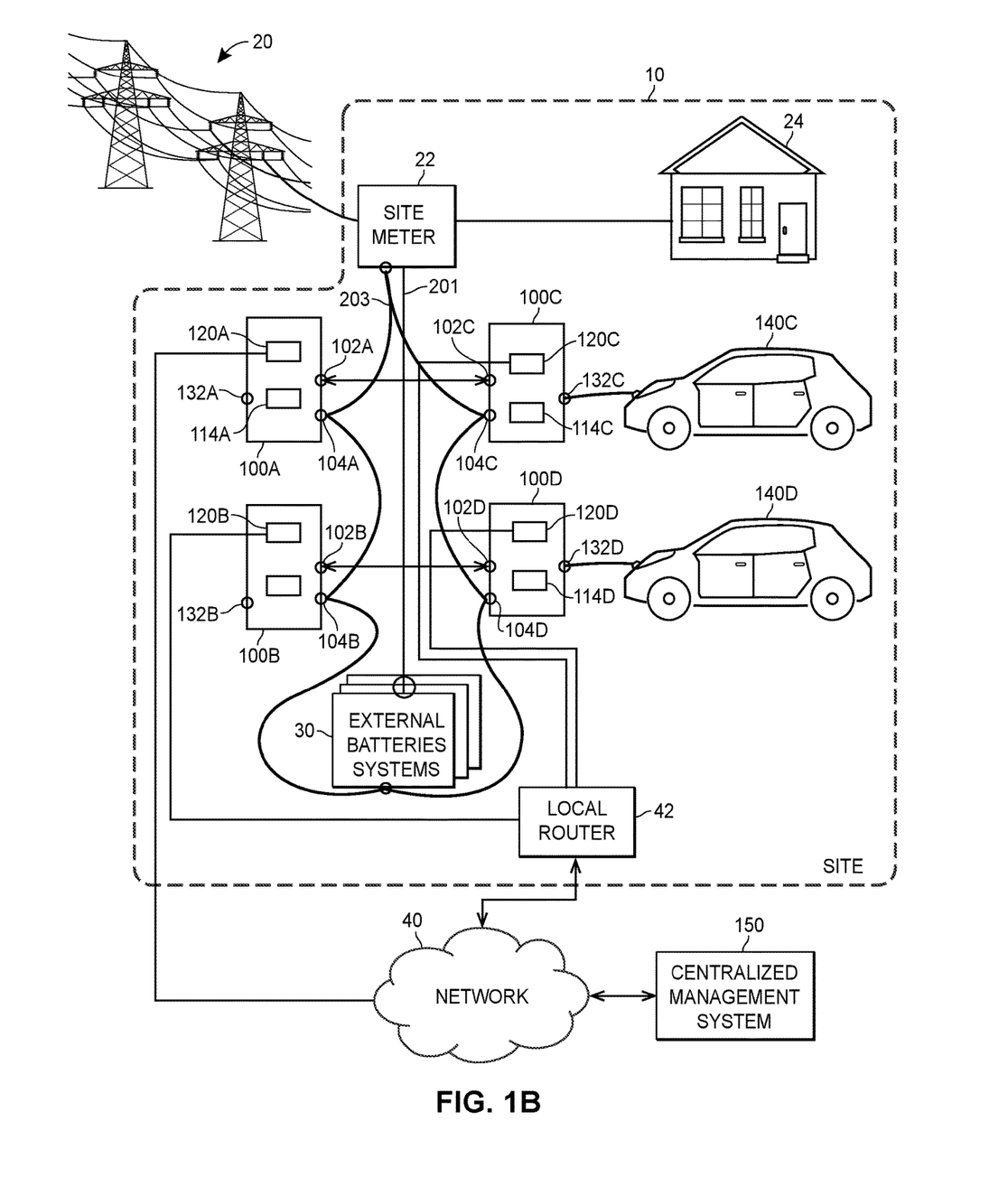

FIGS. 1A-B illustrate block diagrams of examples of a charging site 10 configured for energy management between a non-charging load 24 and multiple EV charging systems 100A-D via a local AC circuit 201 or 203. The charging site 10 is supplied with AC power from an electric power grid 20 via a site meter 22, which records power consumption and connects the various electrical components disposed at the charging site 10 to the electric power grid 20. Thus, the electric power grid 20 provides AC power to each of the EV charging systems 100A-D and other electrical components via the site meter 22, including providing AC power to the non-charging load 24 (e.g., commercial building electrical infrastructure) at the charging site 10. In some embodiments, the site meter 22 is a smart meter including additional control logic and communication functionality. For example, the site meter 22 may be configured to communicate with one or more external servers (not show) and/or the centralized management system 150 to obtain demand data regarding load on or demand charges for AC power from the electric power grid 20. In some such embodiments, the site meter 22 may be configured to disconnect part or all of the loads from the electric power grid 20 upon the occurrence of certain conditions (e.g., during peak hours or when the power grid is unstable due to high demand). In this way, the site meter 22 may be used to separate the charging site 10 from the electric power grid 20 when needed. Although only one site meter 22 is shown, some embodiments may include a plurality of meters, each of which may perform part or all of the operation of the site meter 22. Such embodiments may be implemented to facilitate more targeted control of operations of individual EV charging systems 100 or non-charging loads 24 at the charging site 10.

The AC power from the site meter 22 is provided as an input AC electric power to the respective input ports 102A-D of the EV charging systems 100A-D via one or more wired AC connections forming the local AC circuit 201. In some embodiments, the input AC electric power is received at each of the input ports 102A-D as a 120V or 240V single-phase or three-phase AC power supply. As discussed elsewhere herein, each of the EV charging systems 100A-D converts and stores such input AC electric power to DC power stored in batteries of respective energy storage modules 114A-D, from which charging currents may be provided to vehicles via vehicle couplings 132A-D of the EV charging systems 100A-D and from which power may be provided to the non-charging load 24. The EV charging systems 100A-D are controlled by respective system controllers 120A-D, which monitor operating data of the respective EV charging systems 100A-D and control charging and discharging of the energy storage modules 114A-D.

In some embodiments, the DC power may be stored in the energy storage modules 114A-D over an interval of time in order to provide charging current to EVs via respective vehicle couplings 132A-D at a faster rate than the input AC electric power is received by the EV charging systems 100A-D. While this has significant advantages in reducing the electrical infrastructure requirements for the charging site 10, some of the EV charging systems 100A-D may be used more that others. For example, EV charging systems 100C and 100D may experience greater use due to closer proximity to a destination (e.g., by being located in a parking lot at locations nearer an entrance to a commercial building). As illustrated, vehicles 140C and 140D may be connected to EV charging systems 100C and 100D by vehicle couplings 132C and 132D, respectively, in order to receive charging currents from energy stored in the energy storage modules 114C and 114D, while no vehicles are charging at EV charging systems 100A and 100B. Thus, the batteries of EV charging systems 100C and 100D will discharge faster than those of EV charging systems 100A and 100B, resulting in a charge imbalance among the energy storage modules 114A-D. To address such an imbalance, energy may be transferred from EV charging systems 100A and 100B to EV charging systems 100C and 100D via local AC circuits 201 or 203.

As discussed elsewhere herein, the EV charging systems 100A-D are configured and controlled by the system controllers 120A-D and/or the centralized management system 150 to transfer charge via local AC circuit 201 or 203 as needed to provide electric power to non-charging loads 24 and/or other EV charging systems 100A-D at the charging site 10. To provide such AC output power, the DC power provided by one or more of the energy storage modules 114A-D is converted to an AC current by an inverter (e.g., bidirectional inverter 110, discussed below) and provided to the local AC circuit 201 or 203. As noted above, the input AC electric power may be received at each of the input ports 102A-D as a 120V or 240V single-phase or three-phase AC power supply. In various embodiments, the AC output power at input ports 102A-D or input ports 104A-D may be provided according to the same or different voltage and phase combinations. In some embodiments, multiple inverters may be used to provide a first voltage to other EV charging systems 100A-D via the local AC circuit 201 and to provide a different second voltage to a non-charging load 24 via the local AC circuit 203. Likewise, in various embodiments, AC output power provided to the non-charging load 24 may be provided though the site meter 22, or the non-charging load 24 may be directly connected to the local AC circuit 201 or 203 to receive the AC output power while bypassing the site meter 22. In further embodiments, the respective system controllers 120A-D of the donor EV charging systems 100A-D may be configured to control the phase of the AC output power to the local AC circuit 201 or 203 to match that of the input AC electric power from the site meter 22 or of other donor EV charging systems 100A-D.

FIG. 1A illustrates an embodiment in which one local AC circuit 201 carries both the input AC electric power from the electric power grid 20 via the site meter 22 and AC output power provided by the EV charging systems 100A-D to the non-charging load 24. In such embodiments, the respective input ports 102A-D serve to both receive an AC input current from the local AC circuit 201 and provide an AC output current to the local AC circuit 201. In such embodiments, the local AC circuit 201 is further connected to one or more non-charging loads 24 at the charging site 10 in order to provide AC power to such non-charging loads 24 when the electric power grid 20 is disconnected or unavailable, either directly or via the site meter 22.

FIG. 1B illustrates an embodiment in which a separate local AC circuit 203 carries AC output power provided by the EV charging systems 100A-D to the non-charging load 24, while the local AC circuit 201 carries the input AC electric power from the electric power grid 20. As illustrated, the local AC circuit 201 may be connected to each of the EV charging systems 100A-D via respective input ports 102A-D, while the local AC circuit 203 may be connected to each of the EV charging systems 100A-D via the respective input ports 104A-D. Such separation of the local AC circuits 201 and 203 may be advantageous in some situations by enabling charging the EV charging systems 100A-D (and, in some embodiments, charge transfers among the EV charging systems 100A-D) at a first voltage via local AC circuit 201, while providing a second voltage to the non-charging load 24 via local AC circuit 203 (either directly or indirectly via the site meter 22). For example, local AC circuit 201 may carry 240V three-phase current, while local AC circuit 203 carries 120V single-phase current. In some embodiments, the local AC circuit 203 is also connected to the site meter 22, such that the site meter 22 receives AC output power from the local AC circuit 203 and provides such AC output power to one or more non-charging loads 24 at the charging site 10 in order to provide AC power to such non-charging loads 24 when the electric power grid 20 is disconnected or unavailable.

In some embodiments, the local AC circuit 201 and/or 203 also connects one or more external battery systems 30 to the EV charging systems 100A-D in order to increase the storage capacity at the charging site 10. Such external battery systems 30 may receive input AC power from the electric power grid 20 via local AC circuit 201 and/or from the EV charging systems 100A-D via local AC circuit 203 in order to charge one or more batteries (not shown) of the external battery systems 30. Such external battery systems 30 may comprise various components (not shown), including controllers and bidirectional inverters or separate rectifiers and inverters in order to convert the input AC power into DC power for storage and later convert the stored DC power into output AC power for the non-charging load 24 or the EV charging systems 100A-D.

To facilitate control decisions, in some embodiments, each of the system controllers 120A-D is connected via wired or wireless communication connections with the other system controllers 120A-D and/or with the centralized management system 150 to exchange electronic messages or signals. The centralized management system 150 may communicate with each of the EV charging systems 100A-D in order to monitor operating data regarding the EV charging systems 100A-D and to determine and control AC output current supply to the non-charging load 24 as needed. The centralized management system 150 may be located at the charging site 10 or at a location remote from the charging site 10. When remote from the charging site 10, the centralized management system 150 may be communicatively connected to the EV charging systems 100A-D via a network 40, which may be a proprietary network, a secure public internet, a virtual private network, or some other type of network, such as dedicated access lines, plain ordinary telephone lines, satellite links, cellular data networks, or combinations of these. In various embodiments, the EV charging systems 100A-D may be communicatively connected with the network 40 directly or via a local router 42. In some embodiments in which the centralized management system 150 is located at the charging site 10, the centralized management system 150 may be combined with or incorporated within any of the EV charging systems 100A-D. In still further embodiments, the centralized management system 150 may be configured as a local cloud or server group distributed across the system controllers 120A-D of the EV charging systems 100A-D in order to provide robust control in the event of a network disruption.

In some embodiments, the centralized management system 150 may also communicate with remote EV charging systems that are deployed in locations remote from the charging site 10, which locations may be separated by large geographic distances. For example, the centralized management system 150 may communicate with EV charging systems 100 located in different parking facilities, on different floors of the same parking structure, or in different cities. Such centralized management system 150 may comprise one or more servers configured to receive operating data from and to send data and/or control commands to each of the EV charging systems 100A-D. To facilitate communication, the centralized management system 150 may be communicatively connected to the system controllers 120A-D of the EV charging systems 100A-D via an electronic communication link with a communication interface module (not shown) within each of the EV charging systems 100A-D.

The centralized management system 150 may group or relate EV charging systems according to their location, their intended function, availability, operating status, and capabilities. The centralized management system 150 may remotely configure and control the EV charging systems, including the EV charging systems 100A-D. The centralized management system 150 may remotely enforce regulations or requirements governing the operation of the EV charging systems 100A-D. The centralized management system 150 may remotely interact with users of the EV charging systems 100A-D. The centralized management system 150 may remotely manage billing, maintenance, and error detection for each of the EV charging systems 100A-D. For example, error conditions at any of the EV charging systems 100A-D may be reported by such EV charging system to the centralized management system 150 for analysis. The centralized management system 150 may also communicate with mobile communication devices of users of the EV charging systems 100A-D, such as mobile communication devices or other computing devices used by operators of the EV charging systems 100A-D to enable the operator to self-configure the EV charging systems 100A-D, charge pricing, language localization, currency localization, and so on. Operation of the centralized management system 150 in relation to controlling charging and discharging of the EV charging systems 100A-D is further described elsewhere herein.

Figure 2:
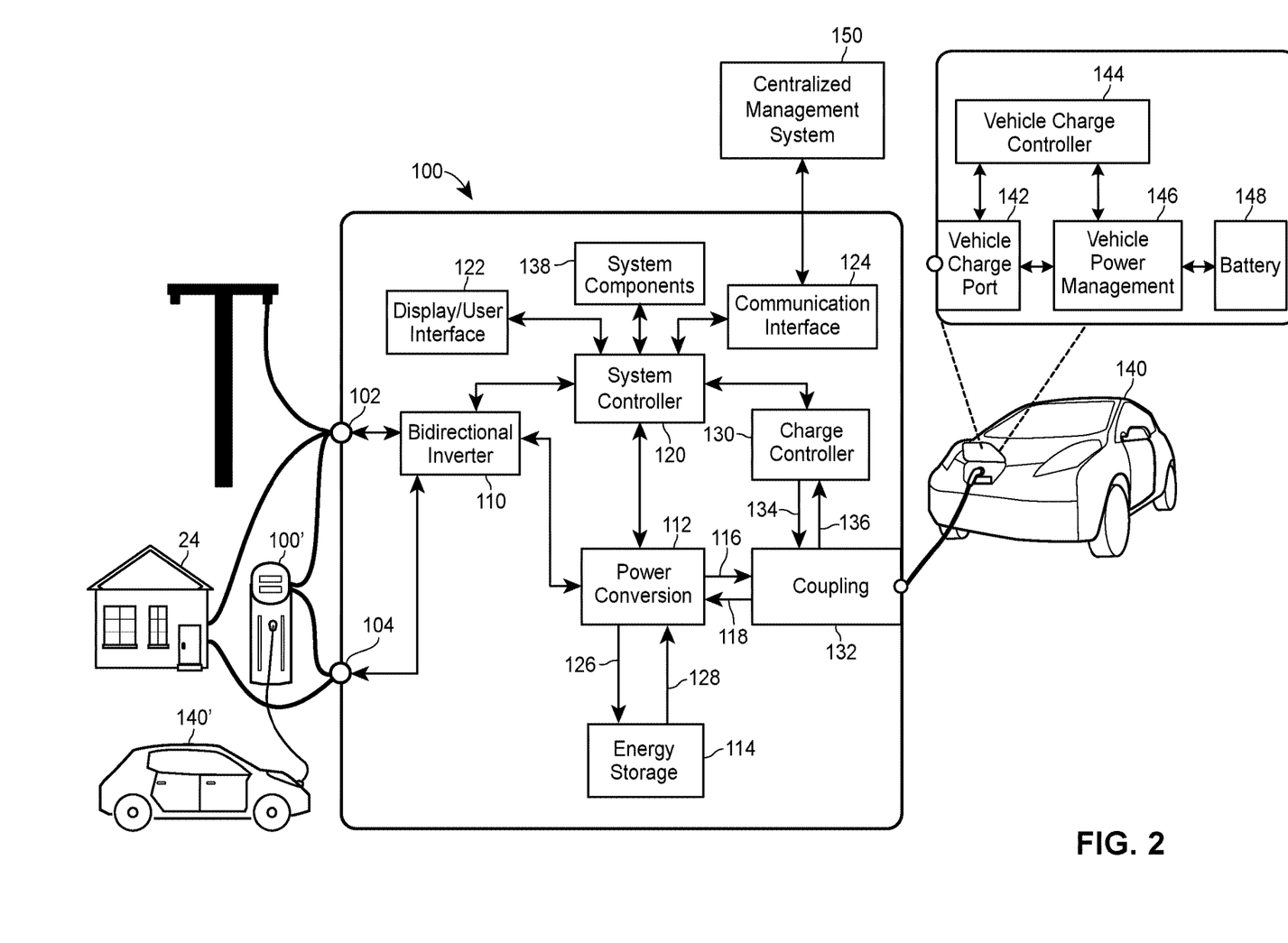
FIG. 2 illustrates a block diagram of an example of an electric vehicle charging system configured for AC charge transfer in accordance with certain aspects disclosed herein.

FIG. 2 illustrates a block diagram of an example of an EV charging system 100 configured in accordance with certain aspects disclosed herein. The EV charging system 100 may be any of the EV charging systems 100A-D at the charging site 10 illustrated in FIG. 1A. The EV charging system 100 is configured to receive electric power from a power source (e.g., electric power grid 20) via an input port 102 or 104 in order to charge an energy storage module 114 (e.g., one or more batteries), from which the EV charging system 100 provides a charging current to a vehicle 140 in order to charge a battery 148 of the vehicle 140. Such charge is provided through a vehicle coupling 132, which may comprise a charging cable utilizing one or more standard connector types (e.g., Combined Charging System (CCS) or Charge de Move (CHaDEMO) connectors). In addition to being connected to one or more power sources via the input ports 102 or 104, the EV charging system 100 is connected to the non-charging load 24 and an additional EV charging system 100' through one or both of the local AC circuits 201 and 203. Through such local AC circuit 201 or 203, the EV charging system 100 is configured to provide an AC current to the non-charging load 24, as controlled by a system controller 120 of the EV charging system 100. In some embodiments, the EV charging system 100 may be further configured to transfer charge to or receive a charge transfer from one or more additional EV charging systems 100'. Although the illustrated EV charging system 100 is illustrated as communicating with a centralized management system 150, alternative embodiments of the EV charging system 100 need not be configured for such external communication. Additional or alternative components and functionality may be included in further alternative embodiments of charging systems.

The EV charging system 100 includes a bidirectional inverter 110 configured to receive an input electric power at an input port 102 or 104 and to provide DC power to a power conversion module 112 to charge one or more batteries of the energy storage module 114. The bidirectional inverter 110 is configured to operate in an inverter mode or in a rectifier mode at various times as controlled by the system controller 120. In the rectifier mode, the bidirectional inverter 110 converts an input AC current from a power source (e.g., the electric power grid 20 or an additional EV charging system 100' via a local AC circuit 201 or 203) into a DC current to be provided to the energy storage module 114 via a power conversion module 112. In the inverter mode, the bidirectional inverter 110 convers a DC current from the energy storage module 114 via the power conversion module 112 into an output AC current to the local AC circuit 201 or 203 via an input port 102 or 104. Thus, when a triggering condition occurs to cause the EV charging system 100 to provide an AC output current to the local AC circuit 201 or 203 to provide power to the non-charging load 24 at the charging site 10, the bidirectional inverter operates in the inverter mode to convert a DC current from the power conversion module 112 into the AC output power and provide such AC output power to the local AC circuit 201 or 203 via an input port 102 or 104. In some embodiments, a plurality of separate components may instead be configured to perform such functionality of the bidirectional inverter 110, such as by including one or more inverters and rectifiers in the EV charging system 100. In further embodiments, part or all of the functionality of the bidirectional inverter 110 may be incorporated into the power conversion module 112, or part or all of the functionality of the power conversion module 112 may be incorporated into the bidirectional inverter 110.

The power conversion module 112 includes some combination of one or more DC-to-DC converters for efficient conversion of DC input power received from the bidirectional inverter 110 to a DC energy storage current 126 provided to the energy storage module 114, which stores the power until needed to provide a charging current 116 to a vehicle 140. In some embodiments, the energy storage module 114 includes high-capacity batteries that have a storage capacity greater than a multiple of the storage capacity in the vehicles 140 to be charged (e.g., three times, five times, or ten times an expected vehicle battery capacity). The storage capacity of the energy storage module 114 may be configured based on the expected average charge per charging event, which may depend upon factors such as the types of vehicles 140 charged, the depletion level of the vehicle batteries 148 when charging starts, and the duration of each charging event. For example, a retail parking site may have more charging events of shorter duration, while a commuter train parking lot may have fewer charging events of longer duration. In various embodiments, the storage capacity of the energy storage module 114 may be configured based on maximum expected charging offset by power received from an electric utility. In some embodiments, the storage capacity of each of the energy storage modules 114 of the EV charging systems 100 and any external battery systems 30 at a charging site 10 may be configured to ensure a total charge stored at the charging site 10 is sufficient for an expected maximum load due to vehicle charging. In further embodiments, the power received from an electric utility may be limited to power available during low-demand times, such as off-peak or low-priced periods of the day. The site meter 22 or the system controller 120 may be configured to block or disconnect inflows of power during peak or high-priced periods of the day. In some such embodiments, the site meter 22 or the system controller 120 may be further configured to enable power reception during peak periods to ensure continued operation of the EV charging system 100 when power levels in the energy storage module 114 are unexpectedly low.

In some embodiments, the power conversion module 112 may further include one or more additional DC-to-DC conversion circuits that receive DC current 128 at a first voltage level from the energy storage module 114 and drive a charging current 116 to a vehicle 140 through a vehicle coupling 132 to supply a vehicle 140 with the charging current 116 via a vehicle charge port 142. The vehicle coupling 132 serves as an electrical interconnect between the EV charging system 100 and the vehicle 140. In various embodiments, such vehicle coupling 132 comprises a charging head and/or a charging cable. For example, the vehicle coupling 132 may comprise a charging cable having a standard-compliant plug for connection with a vehicle charge port 142 of vehicles 140. The vehicle coupling 132 may include both a power connection for carrying the charging current 116 and a communication connection for carrying electronic communication between the charge controller 130 and the vehicle 140. In some embodiments, the EV charging system 100 may comprise multiple vehicle couplings 132, and the power conversion module 112 may include a corresponding number of DC-to-DC conversion circuits specific to each of the multiple couplings. According to some embodiments, the power conversion module 112 may be further configured to receive a reverse current 118 from a vehicle 140 via the vehicle coupling 132, which reverse current 118 may be used to provide a DC energy storage current 126 to add energy to the energy storage module 114. In some examples, the power conversion module 112 includes one or more inverters that convert the DC current 128 to an AC current that can be provided as the charging current 116.

A charge controller 130 controls the charging current 116 and/or reverse current 118 through each vehicle coupling 132. To control charging or discharging of the vehicle 140, the charge controller 130 comprises one or more logic circuits (e.g., general or special-purpose processors) configured to execute charging control logic to manage charging sessions with vehicle 140. Thus, the charge controller 130 is configured to communicate with the system controller 120 to control the power conversion module 112 to provide the charging current 116 to the vehicle 140 or to receive the reverse current 118 from the vehicle 140 via the vehicle coupling 132. In some instances, the charge controller 130 may include power control circuits that further modify or control the voltage level of the charging current 116 passed through the vehicle coupling 132 to the vehicle 140. The charge controller 130 also communicates via the vehicle coupling 132 with a vehicle charge controller 144 within the vehicle 140 to manage vehicle charging. Thus, the charge controller 130 communicates with the vehicle charge controller 144 to establish, control, and terminate charging sessions according to EV charging protocols (e.g., CCS or CHaDEMO). The charge controller 130 may be communicatively connected with the vehicle coupling 132 to provide output signals 134 to the vehicle charge controller 144 and to receive input signals 136 from the vehicle charge controller 144.

A system controller 120 is configured to control operations of the EV charging system 100 by implementing control logic using one or more general or special-purpose processors. The system controller 120 is configured to monitor and control power levels received by the power input module 110, power levels output through the charging current 116, energy levels in the energy storage module 114, input electric power received at an input port 102 or 104, and AC output current provided to the local AC circuit 201 or 203. The system controller 120 is further configured to communicate with and control each of the one or more charge controllers 130, as well as controlling the bidirectional inverter 110 and the power conversion module 112. For example, the system controller 120 is configured to control the power conversion module 112 and the charge controller to supply a charging current 116 to the vehicle coupling 132 in response to instructions from the charge controller 130. As discussed further herein, the system controller 120 is also configured to control (either separately or in coordination with the centralized management system 150) the bidirectional inverter 110 to provide an AC output current to the local AC circuit 201 or 203 to provide power to one or more non-charging loads 24 at the charging site 10.

The system controller 120 controls the provision of AC output current to the local AC circuit 201 or 203 by determining occurrences of triggering conditions for the provision of such power to non-charging loads 24. Thus, the system controller 120 controls the bidirectional inverter 110 to receive DC current from the power storage module 114 via the power conversion module 112 and convert it into an AC output current, which is then provided to one or more input ports 102 or 104. The local AC circuit 201 or 203 serves as a connection between each EV charging system 100 or additional EV charging system 100' and the non-charging load 24 at the charging site 10, thereby facilitating provision of an AC output current from the EV charging system 100 to the non-charging load 24. In some embodiments, the EV charging system 100 may further provide an AC output current to the local AC circuit 201 or 203 to transfer charge from a battery of the EV charging system 100 to an addition battery of the additional EV charging system

100' in order to manage the charges stored in the respective batteries for efficient operation of the charging site 10.

The system controller 120 is also configured to communicate with other various system components 138 of the EV charging system 100 (e.g., other controllers or sensors coupled to the energy storage module 114 or other components of the EV charging system 100) in order to receive operating data and to control operation of the system via operation of such system components 138. For example, the system controller 120 may monitor temperatures within the EV charging system 100 using the system components 138 and may be further configured to mitigate increases in temperature through active cooling or power reductions using the same or different system components 138. Likewise, the system controller 120 communicates with a user interface module 122 (e.g., a touchscreen display) and a communication interface module 124 (e.g., a network interface controller) to provide information and receive control commands. Each communication interface module 124 may be configured to send and receive electronic messages via wired or wireless data connections, which may include portions of one or more digital communication networks.

The system controller 120 is configured to communicate with the components of the EV charging system 100, including power input module 110, power conversion module 112, the user interface module 122, the communication interface module 124, the charge controller 130, and the system components 138 over one or more data communication links. The system controller 120 may also be configured to communicate with external devices, including a vehicle 140 via the vehicle coupling 132, one or more additional EV charging systems 100' (and corresponding additional vehicles 140') via the centralized management system 150, one or more external battery systems 30, a site meter 22, or a non-charging load 24. The system controller 120 may manage, implement or support one or more data communication protocols used to control communication over the various communication links, including wireless communication or communication via a local router 42. The data communication protocols may be defined by industry standards bodies or may be proprietary protocols.

The user interface module 122 is configured to present information related to the operation of the EV charging system 100 to a user and to receive user input. The user interface module 122 may include or be coupled to a display with capabilities that reflect intended use of the EV charging system 100. In one example, a touchscreen may be provided to present details of charging status and user instructions, including instructions describing the method of connecting and disconnecting a vehicle 140. The user interface module 122 may include or be coupled to a touchscreen that interacts with the system controller 120 to provide additional information or advertising. The system controller 120 may include or be coupled to a wireless communication interface that can be used to deliver a wide variety of content to users of the EV charging system 100, including advertisements, news, point-of-sale content for products/services that can be purchased through the user interface module 122. The display system may be customized to match commercial branding of the operator, to accommodate language options and for other purposes. The user interface module 122 may include or be connected to various input components, including touchscreen displays, physical input mechanisms, identity card readers, touchless credit card readers, and other components that interact through direct connections or wireless communications. The user interface module 122 may further support user authentication protocols and may include or be coupled to biometric input devices such as fingerprint scanners, iris scanners, facial recognition systems and the like.

In some embodiments, the energy storage module 114 is provisioned with a large battery pack, and the system controller 120 executes software to manage input received from a power source to the battery pack based upon demand level data (e.g., demand or load data from an electric power grid 20 or site meter 22), such that power is drawn from the power source to charge the battery pack at low-load time periods and to avoid drawing power from the grid during peak-load hours. The software may be further configured to manage power output to provide full, fast charging power in accordance with usage generated by monitoring patterns of usage by the EV charging system 100. The use of historical information can avoid situations in which the battery pack becomes fully discharged or depleted beyond a minimum energy threshold. For example, charging may be limited at a first time based upon a predicted later demand at a second time, which later demand may be predicted using historical information. This may spread limited charging capacity more evenly among vehicle throughout the course of a day or in other situations in which battery pack capacity is expected to be insufficient to fully charge all EVs over a time interval, taking account of the ability to add charge to the energy storage module 114.

In further embodiments, the system controller 120 executes software (either separately or in coordination with the centralized management system 150) to manage energy draw and use by controlling charging and discharging over time among multiple EV charging systems 100 at the charging site 10. Thus, the charge drawn from the power source may be limited or avoided during peak-load hours by charge transfer between the EV charging system 100 and one or more additional EV charging systems 100' via the local AC circuit 201 or 203 at the charging site 10, effectively pooling the energy stored in the batteries of all of the charging systems at the charging site 10. As noted above, in some embodiments, the charging site 10 may include one or more external battery systems 30 connected to the local AC circuit 201 or 203. In such embodiments, the systems controller 120 and/or the centralized management system 150 may further manage energy inflow and outflow at the charging site 10 by controlling selective charging and discharging such batteries at appropriate time periods to avoid or reduce total power draw of the charging site 10 from the power source during peak-demand or other high-demand times by charging the batteries of the EV charging systems 100 and the external battery systems 30 during low-demand times. In some such embodiments, such energy management enables the EV charging system 100 to continue charging vehicles 140 even when the power source is disconnected or unavailable (e.g., when a local power grid is down). As discussed elsewhere herein, the system controllers 120 of the EV charging systems 100 and/or the centralized management system 150 may manage site-wide energy use by providing AC power to non-charging loads 24. In some embodiments, site-wide energy use may be further managed by the system controllers 120 of the EV charging systems 100 and/or the centralized management system 150 by controlling charge transfers based upon differential charge levels or discharge levels associated with differential utilization of the various EV charging system 100 at the charging site 10 in order to effect charge balancing or to ensure sufficient charge availability for charging vehicles 140 at one or more of the EV charging systems 100.

In some embodiments, the EV charging system 100 may be configured with two or more vehicle couplings 132 to enable concurrent charging of multiple vehicles 140. The system controller 120 may be configured by a user via the user interface module 122 to support multiple modes of operation and may define procedures for charge transfer or power distribution that preserve energy levels in the energy storage module 114 when multiple vehicles 140 are being concurrently charged. Charge transfers may be used to transfer power from EV charging systems 100 that have available power or are not being used to charge a vehicle 140 to EV charging systems 100 that are charging one or more vehicles 140. Charge transfers may further be used to transfer electric power from one or more EV charging systems 100 or 100' to non-charging loads 24 in order to manage total energy use at the charging site 10, particularly during times of peak demand or unreliable power supply from the electric power grid 20. Distribution of power may be configured to enable fast charging of one or more vehicles 140 at the expense of other vehicles 140. In this regard, the vehicle couplings 132 may be prioritized or the system controller 120 may be capable of identifying and prioritizing connected vehicles 140. In some instances, the system controller 120 may be configured to automatically control the respective charge controllers 130 to split available power between two vehicles 140 after the second vehicle 140 is connected. The available power may be evenly split between two vehicles 140 or may be split according to priorities or capabilities. In some examples, the system controller 120 may conduct arbitration or negotiation between connected vehicles 140 to determine a split of charging capacity. A vehicle 140 may request a charging power level at any given moment based on temperature, battery charge level, and other characteristics of the vehicle 140 and its environment and to achieve maximum charge rate and minimum charging time for the current circumstances.

As illustrated, a vehicle 140 may be charged by connecting the vehicle 140 to the EV charging system 100 via a vehicle coupling 132. This may include plugging a charging cable of the EV charging system 100 into a vehicle charge port 142 of the vehicle 140. The vehicle charge port 142 is configured to receive the charging current 116 through the vehicle coupling 132 and provide such received current to a vehicle power management module 146. The vehicle charge port 142 is further configured to provide an electronic communication connection between the vehicle coupling 132 and a vehicle charge controller 144, which controls charging of the vehicle 140. The vehicle power management module 146 is controlled by the vehicle charge controller 144 to provide power to each of one or more batteries 148 of the vehicle 140 in order to charge such battery 148. In some instances, the vehicle charge port 142 includes a locking mechanism to engage and retain a portion of the vehicle coupling 132 in place during charging sessions. For example, for safety reasons, the vehicle charge controller 144 may control a locking mechanism of the vehicle charge port 142 to lock a plug of a charging cable in the vehicle charge port 142 while a charging session is active.

Figure 3:
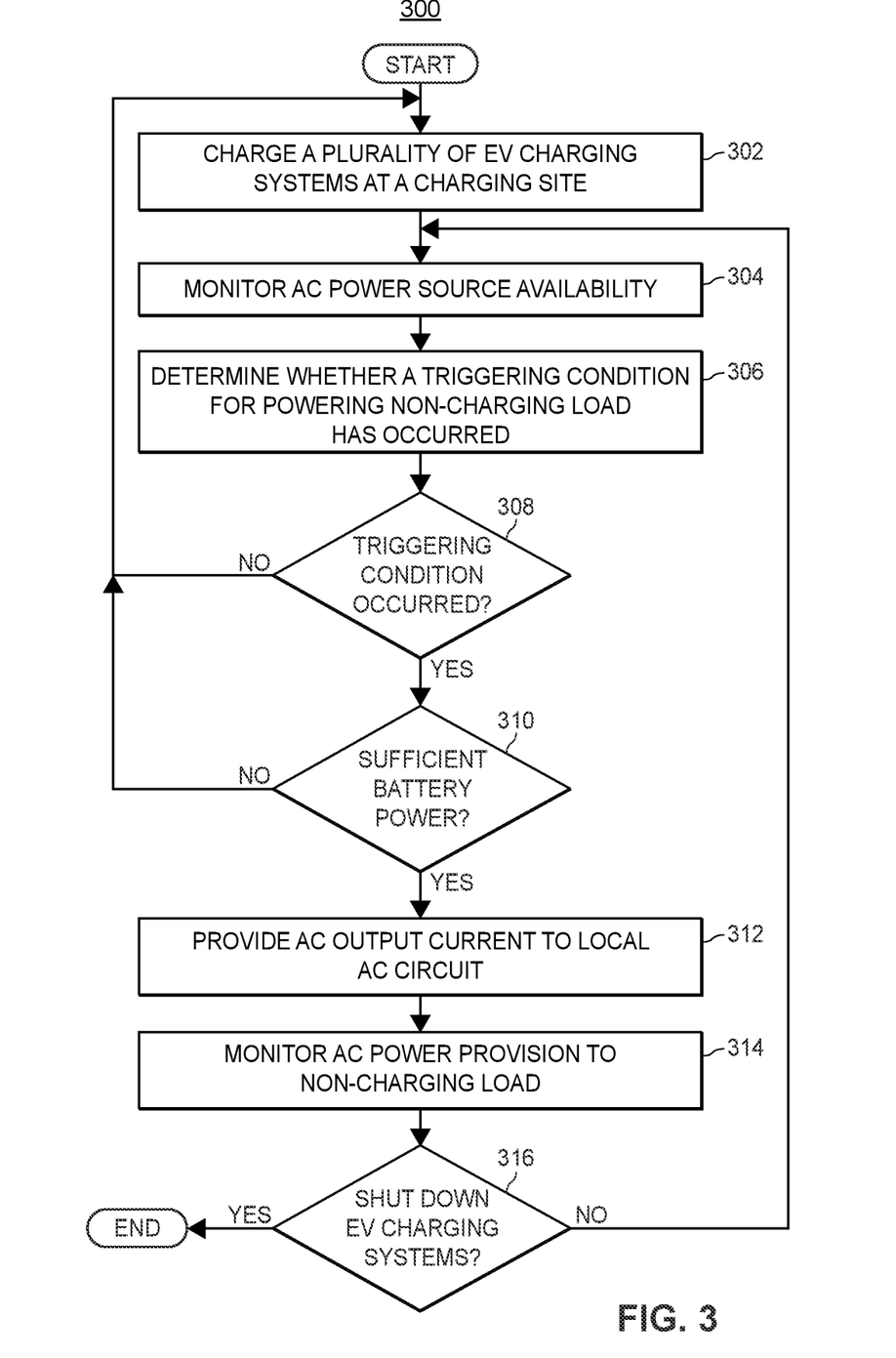
FIG. 3 illustrates a flow diagram of an example energy management method for providing backup power at a charging site in accordance with certain aspects disclosed herein.

FIG. 3 illustrates a flow diagram of an example energy management method 300 for providing backup power to one or more non-charging loads 24 at a charging site 10 in accordance with certain aspects disclosed herein. The charging site 10 may include one or more EV charging systems 100, each connected to at least one non-charging load 24 via a local AC circuit 201 or 203. Aspects of the energy management method 300 may be implemented by one or more system controllers 120 of the one or more EV charging systems 100 or by a centralized management system 150 in communication with such system controllers 120.

The energy management method 300 begins with charging one or more EV charging systems at the charging site 10 from a power source of the charging site 10 in order to store energy at each EV charging system (block 302). Power source data relating to availability of an AC power source for powering the charging site is monitored (block 304). Based upon such power source data (and, in some embodiments, additional operating data or site data), it is determined whether a triggering condition for providing power to a non-charging load has occurred (block 306). When a triggering condition has not occurred (block 308), the EV charging systems continue to charge (block 302). When a triggering condition has occurred (block 308) but there is not sufficient battery power at the one or more EV charging systems (block 310), the EV charging systems continue to charge or attempt to charge using the AC power source (block 302). When a triggering condition has occurred (block 308) and there is sufficient battery power (block 310), the one or more EV charging systems are controlled to provide an AC output current to the non-charging load via a local AC circuit (block 312), and such AC power provision is monitored (block 314). Unless it is determined that the one or more EV charging systems should be shut down (block 316), thus ending the energy management method 300, the method continues with monitoring availability of the AC power source (block 304) and determining whether a triggering condition continues to occur (block 306). Additional or alternative aspects may be included in some embodiments.

At block 302, the centralized management system 150 and/or one or more system controllers 120 associated with corresponding EV charging systems 100 control each such EV charging system 100 to charge from a power source at the charging site 10 (e.g., the electric power grid 20). The power source for charging the batteries of the EV charging systems 100 may be the same as the AC power source providing power to the non-charging loads 24 at the charging site 10, or an additional or alternative power source may be used to charge the EV charging systems 100. For example, a local photovoltaic system may be used to provide part of the charging power to the EV charging systems 100, in addition to obtaining charging power from the electric power grid 20. In some embodiments, the power source provides an input electric power at a lower voltage or lower wattage than the output charging current used to charge vehicles (e.g., vehicles 140). Therefore, charging the batteries of the EV charging systems 100 may occur slowly over a substantially longer time than discharging occurs. In embodiments in which the charging site 10 includes one or more external battery systems 30, the batteries of such components may also be charged from either the power source of the charging site 10 or from an output current from one or more of the EV charging systems 100.

At block 304, the centralized management system 150 and/or one or more system controllers 120 monitor power source data indicative of availability of an AC power source of the charging site 10, such as an electric power grid 20. Such power source data may include an indication of whether the power source is available (e.g., whether the electric power grid 20 is connected and powered to provide electric power to the charging site 10). In some embodiments, the EV charging system 100 may generate such power source data by detecting whether an input electric power is being received at an input port 102. Such power source data may further include demand data regarding load on or demand charges for the power source. In some embodiments, the power source data may further include predictions of future availability or demand, as well as current availability or demand. Thus, the power source data may include one or more of the following charging site conditions: current availability of input electric power from the AC power source, predicted future availability of input electric power from the AC power source, current demand for electric power from the AC power source, or predicted future demand for electric power from the AC power source. In some embodiments, the power source data may be obtained via the site meter 22, which may be a smart meter configured for electronic communication with one or more data servers associated with the AC power source. In various embodiments, the power source data may be received by an electronic message from the site meter 22, a server or controller associated with the AC power source, or monitoring components (e.g., sensors) disposed at the charging site 10 or at an interconnect of the power source near the charging site 10. In some embodiment, the centralized management system 150 and/or one or more system controllers 120 may determine a demand level associated with the AC power source based upon power source data obtained from one or more servers associated with the AC power source.

At block 306, the centralized management system 150 and/or one or more system controllers 120 determine whether a triggering condition for providing AC power to one or more non-charging loads 24 at the charging site 10 has occurred based upon the power source data. The triggering condition is associated with availability of the AC power source (e.g., the electric power grid 20). In some embodiments, additional data may be used in determining whether a triggering condition has occurred. Such additional data may include operating data from the one or more EV charging systems 100 (e.g., battery charge levels, usage levels for charging vehicles 140, or operational status). Such additional data may additionally or alternatively include site data associated with the charging site 10 (e.g., a site energy profile, current or past energy usage by one or more non-charging loads 24, or site demand data from the site meter 22).

Various triggering conditions may be used in various embodiment, and some embodiments may use combinations of multiple triggering conditions. In some embodiments, the triggering condition may comprise detecting or determining an input electric power is no longer being received from the AC power source at the input ports 102 of the one or more EV charging systems 100. In similar embodiments, the triggering condition may comprise detecting or determining an AC electric current is no longer being received from the AC power source at the site meter 22 of the charging site 10. Beyond complete failure of the electric power grid 20 or other AC power source, such unavailability may include failure to meet power quality metrics associated with reliability or consistency of power levels at the charging site 10. In further embodiments, the triggering condition may comprise a demand level of the AC power source exceeding a demand level threshold for a time interval. For example, determining the demand level of the AC power source exceeds the demand level threshold for a time interval determining the load or demand charges of the electric power grid 20 exceeding thresholds associated with high demand relative to supply of power to the grid during a relevant time interval (e.g., a 15-minute demand charge assessment window). Reducing demand at the charging site 10 during such periods of high aggregate demand on the electric power grid 20 may be necessary to stability the grid and prevent grid overload and failure, as well as reducing the cost of electric power used at the charging site 10. An indication of such demand level or an indication that the demand level exceeds to the threshold demand level may be received from the site meter 22, from a server or controller associated with the power source, or from the centralized management system 150.

In some embodiments, the centralized management system 150 or site meter 22 determines occurrence of a triggering condition, then sends a command in an electronic message to the one or more EV charging systems 100 to cause the one or more EV charging systems 100 to provide the AC output current to power the non-charging load 24. For such one or more EV charging systems 100, determination of occurrence of the triggering condition may comprise detecting receipt of such command from the centralized management system 150 or site meter 22. Such electronic message may indicate unavailability of the AC power source, such as a grid outage or total demand level on the grid exceeding a threshold demand level. In further embodiments, the system controllers 120 of the one or more EV charging systems 100 may determine occurrence of the triggering condition based upon the power source data and/or operating data obtained by such system controllers 120.

At block 308, when no triggering condition is determined to have occurred, the energy management method 300 continues with charging the one or more EV charging systems 100 at block 302. When a triggering condition is determined to have occurred at block 308 but the one or more EV charging systems 100 are determined not to have sufficient battery power to provide AC power to the non-charging load 24 at block 310, the energy management method 300 again continues with charging (or attempting to charge) the one or more EV charging systems 100 at block 302. When a triggering condition is determined to have occurred at block 308 and the one or more EV charging systems 100 are determined to have sufficient battery power to provide AC power to the non-charging load 24 at block 310, the energy management method 300 continues with providing such AC power to the non-charging load 24 at block 312.

At block 312, the centralized management system 150 and/or one or more system controllers 120 control the one or more EV charging systems 100 to provide an AC output current to a local AC circuit 201 or 203 to power the non-charging load 24. Providing the AC output current comprises controlling the bidirectional inverter 110 of each of the one or more EV charging systems 100 to convert a DC current from the energy storage module 114 into an AC output current, which is then provided to the non-charging load 24 via a local AC circuit 201 or 203 at the charging site 10 to power the non-charging load 24. The AC output current may be provided by to either or both the input ports 102 or 104. In various embodiments, the charging site 10 may be disconnected from the electric power grid 20 as a stand-alone island comprising the power circuits at the charging site 10 (including the local AC circuit 201 or 203), or the charging site 10 may continue to be connected to the electric power grid 20 while the one or more EV charging systems 100 supply part or all of the power demand at the charging site 10 (e.g., power part or all of the non-charging load 24). In some embodiments, the site meter 22 may disconnect or limit the power provided by the electric power grid 20 while the AC output current is being provided by the one or more EV charging systems 100, thus isolating the local AC circuit 201 or 203 at the charging site 10 from the electric power grid 20. Alternatively, both the electric power grid 20 and the one or more EV charging systems 100 may simultaneously provide part of the power used by the non-charging load 24, with the one or more EV charging systems 100 reducing the power drawn from the electric power grid 20. Thus, the respective controllers 120 of the EV charging systems 100 may control the phase of the AC output power provided to the local AC circuit 201 or 203 to match that of the input AC electric power from the electric power grid 20 at the site meter 22. In various embodiments, the AC output current may be provided by any number of the one or more EV charging systems 100 to provide the level of power required by the non-charging load 24, and the number of EV charging systems 100 providing the AC output current may be coordinated by the system controllers 120 or controlled by the centralized management system 150. In embodiments in which one or more external battery systems 30 are present at the charging site 10, a controller associated with each such external battery system 30 may additionally control one or more batteries thereof to provide AC power to the local AC circuit 201 or 203 to power the non-charging load 24.

At block 314, the centralized management system 150 and/or one or more system controllers 120 monitor the provision of the AC power to the non-charging load 24 via the local AC circuit 201 or 203 while the AC output current is being provided. Such monitoring may include measuring or determining current in the local AC circuit 201 or 203, operating status of the non-charging load 24, total demand at the charging site 10, or other similar information regarding local power supply and use via the local AC circuits 201 and/or 203. In some embodiments, operating data regarding the one or more EV charging systems 100 may also be monitored. Such operating data may include data regarding an operational status of each EV charging system 100 (e.g., whether operating normally, in need of repair, charging, discharging, or at full charge), a charge level of the one or more batteries of each EV charging system 100, a charging rate of each EV charging system 100 regarding charging from any power sources, a discharging rate of each EV charging system 100 relating to vehicle charging, or an energy transfer rate of each EV charging system 100 relating to energy transfers among the EV charging systems 100. The charging, discharging, and energy transfer rates may include current rates or potential rates (e.g., maximum available rates).

At block 316, when no determination to shut down the one or more EV charging systems 100 has been made, the energy management method 300 continues with monitoring the AC power source availability at block 304 to determine whether the triggering condition continues to occur at block 306. When a determination to shut down the one or more EV charging systems 100 has been made, the energy management method 300 ends and the EV charging systems 100 are shut down. It may be necessary under certain conditions to shut down the one or more EV charging systems 100 due to damage, malfunctioning, depleted batteries, or other causes. Shutting down the EV charging systems 100 when battery levels fall below a critical threshold may be beneficial by permitting a controlled shutdown and, in some embodiments, a warning or alert prior to discontinuation of provision of AC power to the non-charging load 24.

Additional Description Related to Controllers

Figure 4:
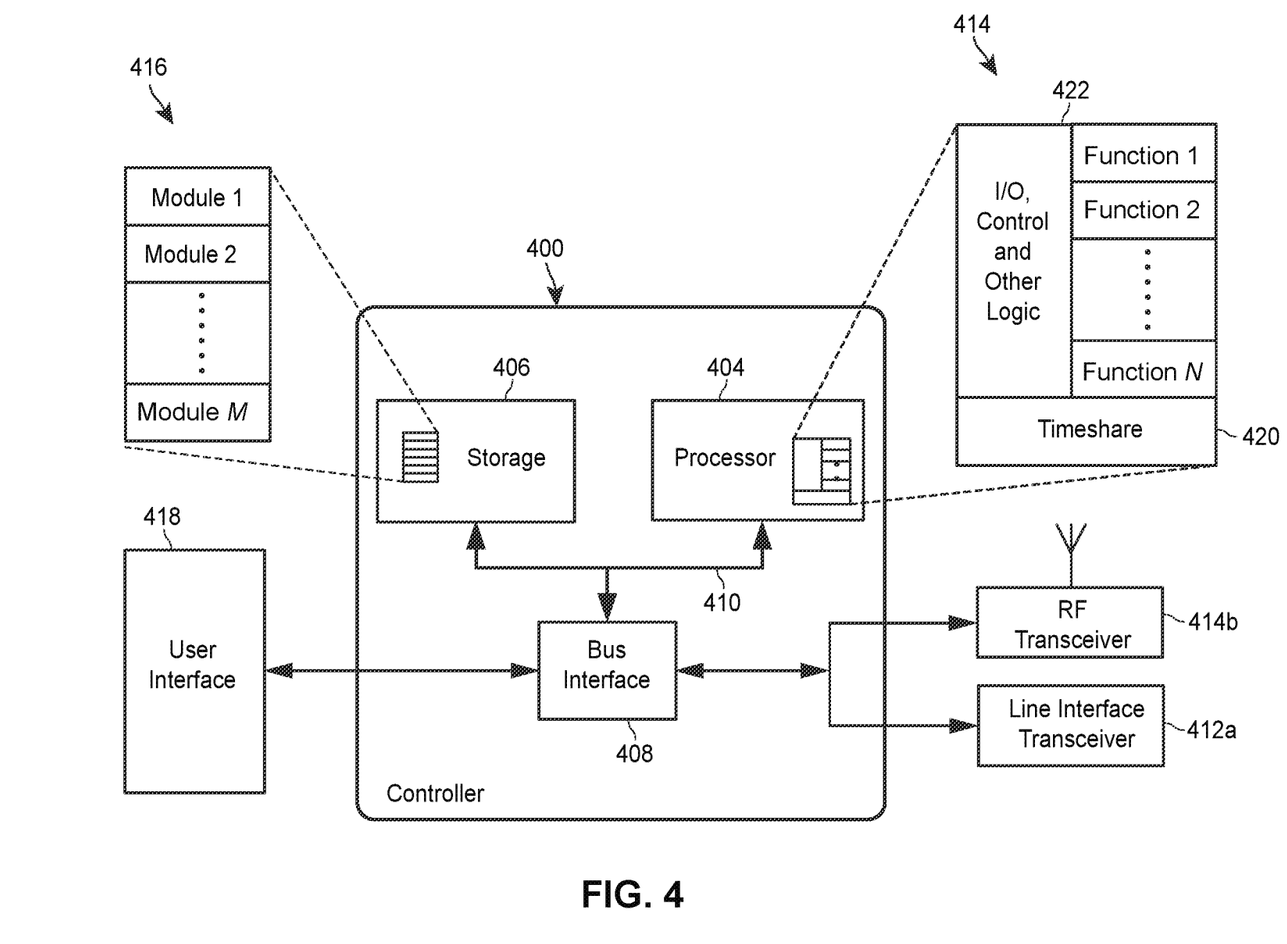
FIG. 4 illustrates a block diagram illustrating a simplified example of a hardware implementation of a controller in accordance with certain aspects disclosed herein.

FIG. 4 illustrates a block diagram illustrating a simplified example of a hardware implementation of a controller 400, such as any of the system controller 120, the charge controller 130, the vehicle charge controller 144, or the centralized management system 150 disclosed herein. In some embodiments, the controller 400 may be a controller of a site meter 22, an external battery system 30, or any other component disclosed herein that implements control logic to control any aspect of the described systems and methods. The controller 400 may include one or more processors 404 that are controlled by some combination of hardware and software modules. Examples of processors 404 include microprocessors, microcontrollers, digital signal processors (DSPs), application-specific integrated circuits (ASICs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 404 may include specialized processors that perform specific functions, which may be configured by one or more of the software modules 416. The one or more processors 404 may be configured through a combination of software modules 416 loaded during initialization and may be further configured by loading or unloading one or more software modules 416 during operation.

In the illustrated example, the controller 400 may be implemented with a bus architecture, represented generally by the bus 410. The bus 410 may include any number of interconnecting buses and bridges depending on the specific application of the controller 400 and the overall design constraints. The bus 410 links together various circuits including the one or more processors 404 and storage 406. Storage 406 may include memory devices and mass storage devices, any of which may be referred to herein as computer-readable media. The bus 410 may also link various other circuits, such as timing sources, timers, peripherals, voltage regulators, and power management circuits. A bus interface 408 may provide an interface between the bus 410 and one or more line interface circuits 412, which may include a line interface transceiver circuit 412a and a radio frequency (RF) transceiver circuit 412b. A line interface transceiver circuit 412a may be provided for each networking technology supported by the controller. In some instances, multiple networking technologies may share some or all of the circuitry or processing modules found in a line interface circuit 412, such as line interface transceiver circuit 412a for wired communication and RF transceiver circuit 412b for wireless communication. Each line interface circuit 412 provides a means for communicating with various other devices over a transmission medium. In some embodiments, a user interface 418 (e.g., touchscreen display, keypad, speaker, or microphone) may also be provided, and may be communicatively coupled to the bus 410 directly or through the bus interface 408.

A processor 404 may be responsible for managing the bus 410 and for general processing that may include the execution of software stored in a computer-readable medium that may include the storage 406. In this respect, the processor 404 of the controller 400 may be used to implement any of the methods, functions, and techniques disclosed herein. The storage 406 may be used for storing data that is manipulated by the processor 404 when executing software, and the software may be configured to implement any of the methods disclosed herein.

One or more processors 404 in the controller 400 may execute software. Software may include instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 406 or in an external computer readable medium. The external computer-readable medium and/or storage 406 may include a non-transitory computer-readable medium. A non-transitory computer-readable medium includes, by way of example, a magnetic storage device (e.g., hard disk, floppy disk, magnetic strip), an optical disk, a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. Portions of the computer-readable medium or the storage 406 may reside in the controller 400 or external to the controller 400. The computer-readable medium and/or storage 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 406 may maintain software maintained or organized in loadable code segments, modules, applications, programs, etc., which may be referred to herein as software modules 416. Each of the software modules 416 may include instructions and data that, when installed or loaded on the controller 400 and executed by the one or more processors 404, contribute to a run-time image 414 that controls the operation of the one or more processors 404. When executed, certain instructions may cause the controller 400 to perform functions in accordance with certain methods, algorithms, and processes described herein.

Some of the software modules 416 may be loaded during initialization of the controller 400, and these software modules 416 may configure the controller 400 to enable performance of the various functions disclosed herein. For example, some software modules 416 may configure internal devices or logic circuits 422 of the processor 404, and may manage access to external devices such as line interface circuits 412, the bus interface 408, the user interface 418, timers, mathematical coprocessors, etc. The software modules 416 may include a control program or an operating system that interacts with interrupt handlers and device drivers to control access to various resources provided by the controller 400. The resources may include memory, processing time, access to the line interface circuits 412, the user interface 418, etc.

One or more processors 404 of the controller 400 may be multifunctional, whereby some of the software modules 416 are loaded and configured to perform different functions or different instances of the same function. For example, the one or more processors 404 may additionally be adapted to manage background tasks initiated in response to inputs from the user interface 418, the line interface circuits 412, and device drivers. To support the performance of multiple functions, the one or more processors 404 may be configured to provide a multitasking environment, whereby each of a plurality of functions is implemented as a set of tasks serviced by the one or more processors 404 as needed or desired. In one example, the multitasking environment may be implemented using a timesharing program 420 that passes control of a processor 404 between different tasks, whereby each task returns control of the one or more processors 404 to the timesharing program 420 upon completion of any outstanding operations or in response to an input such as an interrupt. When a task has control of the one or more processors 404, the processing circuit is effectively specialized for the purposes addressed by the function associated with the controlling task. The timesharing program 420 may include an operating system, a main loop that transfers control on a round-robin basis, a function that allocates control of the one or more processors 404 in accordance with a prioritization of the functions, or an interrupt-driven main loop that responds to external events by providing control of the one or more processors 404 to a handling function.

Other Considerations

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. No claim element is to be construed as a means plus function unless the element is expressly recited using the phrase "means for."

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. Unless specifically stated otherwise, the term "some" refers to one or more. Likewise, use of the "a" or "an" are employed to describe elements and components of the embodiments herein. This is done merely for convenience and to give a general sense of the description. This description, and the claims that follow, should be read to include one or at least one and the singular also includes the plural unless the context clearly indicates otherwise.

Upon reading this disclosure, those of skill in the art will appreciate still additional alternative structural and functional designs for the systems and a methods disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for providing electric power to a non-charging load at a charging site having at least one vehicle charging system, comprising:
   receiving, at an input port of the vehicle charging system connected to an input alternating current (AC) circuit, an input electric power from an AC power source that further provides AC power to the non-charging load;
   converting, by a bidirectional inverter of the vehicle charging system, the input electric power into a direct current (DC) energy storage current;
   charging, with the DC energy storage current, a battery of the vehicle charging system;
   providing, via a vehicle coupling of the charging system, a charging current from the battery to a vehicle in order to charge a vehicle battery of the vehicle;
   determining, by a system controller of the vehicle charging system, occurrence of a triggering condition associated with availability of the AC power source based upon power source data regarding the AC power source; and
   in response to determining occurrence of the triggering condition:
      controlling, by the system controller, the bidirectional inverter of the vehicle charging system to convert a DC current from the battery into an AC output current, wherein the AC output current is provided via an AC output port to the non-charging load via a local AC circuit at the charging site to power the non-charging load while continuing to provide the charging current to the vehicle from the battery, wherein the AC output port is separate from the input port, wherein the local AC circuit is separate from the input AC circuit, and wherein the vehicle charging system is configured to provide the AC output current to the AC output port only from the bidirectional inverter as an AC current derived from the DC current from the battery, wherein the local AC circuit further connects the vehicle charging system to (i) an additional input port of an additional vehicle charging system at the charging site and (ii) an external battery system;
      controlling, by an additional system controller of the additional vehicle charging system, an additional bidirectional inverter of the additional vehicle charging system to convert an additional DC current from an additional battery of the additional vehicle charging system into an additional AC output current, wherein the additional AC output current is provided to the non-charging load via the local AC circuit at the charging site to power the non-charging load; and
      controlling, by a controller of the external battery system, the external battery system to provide an AC external battery output current to the local AC circuit to power the non-charging load, wherein the external battery system converts a DC external battery output current derived from one or more batteries of the external battery system into the AC external battery output current.

2. The method of claim 1, wherein determining occurrence of the triggering condition comprises determining the input electric power is no longer being received at the input port.

3. The method of claim 1, wherein the AC power source comprises an electric power grid and the triggering condition comprises a demand level of the electric power grid exceeding a demand level threshold for a time interval.

4. The method of claim 1, wherein determining occurrence of the triggering condition comprises detecting receipt of an electronic message from either a site meter or a centralized management system, the electronic message indicating a demand level for the AC power source exceeds a threshold demand level.

5. The method of claim 1, wherein each of the system controller and the additional system controller respectively controls providing the AC output current and the additional AC output current according to commands from a centralized management system.

6. The method of claim 1, wherein the triggering condition comprises receipt by the system controller of an electronic message including a command to provide the AC output current, and further comprising:
   monitoring, by a centralized management system, the power source data regarding the AC power source;
   generating, by the centralized management system, an electronic message including the command to provide the AC output current; and
   sending, from the centralized management system to the system controller, the electronic message via a communication network.

7. The method of claim 1, wherein the input electric power is received at the input port at a first voltage and the AC output current is provided to the AC output port at a second voltage different from the first voltage.

8. A site charging system for providing electric power to a non-charging load at a charging site, comprising:
   a plurality of vehicle charging systems at the charging site connected via a local alternating current (AC) circuit, each vehicle charging system comprising:
      one or more input ports connected to an input AC circuit and configured to receive input electric power from an AC power source via the input AC circuit that further provides AC power to the non-charging load;
      an AC output port connected to a local AC circuit that is separate from the input AC circuit;
      a battery configured to receive and store direct current (DC) electric power derived from the input electric power;
      a bidirectional inverter disposed between the one or more input ports and the battery, the bidirectional inverter being configured to convert the input electric power from the one or more input ports into a DC energy storage current to charge the battery and to convert a DC current from the battery into an AC output current to be supplied from the vehicle charging system to the local AC circuit via the AC output port, wherein the vehicle charging system is configured to provide the AC output current to the AC output port only from the bidirectional inverter as an AC current derived from the DC current from the battery;

a vehicle coupling configured to receive a charging current from the battery and to provide an electrical interconnect between the vehicle charging system and a respective vehicle in order to provide the charging current to the vehicle; and a system controller comprising one or more processors configured to control operation of the respective vehicle charging system to provide the charging current from the battery to the respective vehicle via the vehicle coupling in order to charge a respective vehicle battery of the vehicle;

an external battery system connected to the local AC circuit and configured to convert the AC output current received via the local AC circuit into a DC external battery current, charge one or more batteries of the external battery system using the DC external battery current, and convert a DC external battery output current derived from the one or more batteries into an AC external battery output current; and a centralized management system communicatively connected to the plurality of vehicle charging systems via an electronic communication connection, comprising one or more processors configured to:

determine occurrence of a triggering condition associated with availability of the AC power source based upon power source data regarding the AC power source; and in response to determining occurrence of the triggering condition, (i) cause the respective system controllers of at least one of the plurality of charging systems to control the respective bidirectional inverters of the vehicle charging systems to convert the DC currents from the respective batteries into the AC output current to provide the AC output current to the non-charging load via the local AC circuit at the charging site to power the non-charging load while continuing to provide the respective charging current to the respective vehicle from the respective battery and (ii) cause the external battery system to provide the AC external battery output current to the local AC circuit to power the non-charging load.

9. The site charging system of claim 8, wherein the one or more processors of the centralized management system are further configured to:

monitor the power source data regarding the AC power source;

generate an electronic message including the command to provide the AC output current; and send the electronic message to each of the respective system controllers of the plurality of vehicle charging systems via a communication network.

10. The site charging system of claim 9, wherein:

the AC power source comprises an electric power grid;

the one or more processors of the centralized management system are configured to monitor the power source data by:

obtaining the power source data from a server associated with the electric power grid; and determining a demand level associated with the electric power grid based upon the power source data; and the triggering condition comprises the demand level exceeding a demand level threshold for a time interval.

11. The site charging system of claim 9, wherein the input electric power is received at the input port of each vehicle charging system at a first voltage and the AC output current is provided to the AC output port of each vehicle charging system at a second voltage different from the first voltage.

* * * * *